United States Patent
Sharma et al.

(10) Patent No.: US 9,237,340 B2
(45) Date of Patent: Jan. 12, 2016

(54) CAMERA POSE ESTIMATION

(71) Applicant: Texas Instruments Incorporated, Dallas, TX (US)

(72) Inventors: Vinay Sharma, Dallas, TX (US); Peter Charles Barnum, Berkeley, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 268 days.

(21) Appl. No.: 14/051,161

(22) Filed: Oct. 10, 2013

(65) Prior Publication Data

US 2014/0098242 A1  Apr. 10, 2014

Related U.S. Application Data

(60) Provisional application No. 61/711,992, filed on Oct. 10, 2012.

(51) Int. Cl.
*G06T 7/00* (2006.01)
*H04N 5/232* (2006.01)
*H04N 5/222* (2006.01)
*H04N 17/00* (2006.01)

(52) U.S. Cl.
CPC ............ *H04N 17/002* (2013.01); *G06T 7/0044* (2013.01); *H04N 5/2224* (2013.01); *H04N 5/232* (2013.01); *G06T 2207/10016* (2013.01); *G06T 2207/30244* (2013.01)

(58) Field of Classification Search
CPC ... H04N 17/002; H04N 5/2224; H04N 5/232; G06T 7/0044; G06T 2207/10016; G06T 2207/30244
See application file for complete search history.

(56) References Cited

U.S. PATENT DOCUMENTS

| | | | |
|---|---|---|---|
| 6,009,210 A * | 12/1999 | Kang | G06K 9/00228 345/156 |
| 7,809,159 B2 * | 10/2010 | Ishiyama | G06T 7/0048 382/103 |
| 8,125,493 B2 * | 2/2012 | Wexler | G06T 15/04 345/428 |
| 8,452,080 B2 * | 5/2013 | Engedal | G06T 7/0046 345/419 |
| 2004/0190766 A1 * | 9/2004 | Watanabe | B25J 9/1697 382/154 |
| 2005/0190972 A1 * | 9/2005 | Thomas | G06K 9/209 382/218 |
| 2005/0286767 A1 * | 12/2005 | Hager | G06K 9/00208 382/190 |
| 2006/0188131 A1 * | 8/2006 | Zhang | G06T 7/0044 382/103 |
| 2012/0062702 A1 * | 3/2012 | Jiang | G06T 7/0044 348/46 |
| 2012/0219188 A1 * | 8/2012 | Kurz | G06K 9/3216 382/103 |

OTHER PUBLICATIONS

Georg Klein and David Murray, "Parallel Tracking and Mapping on a Camera Phone", 8th IEEE International Symposium on Mixed and Augmented Reality, 2009, ISMAR 2009, Orlando, Florida, Oct. 19-22, 2009, pp. 83-86.

* cited by examiner

*Primary Examiner* — Roberto Velez
*Assistant Examiner* — Tuan Le
(74) *Attorney, Agent, or Firm* — Gregory J. Albin; Frank D. Cimino

(57) ABSTRACT

A method of camera pose estimation is provided that includes capturing a model image of a scene at a canonical camera pose, generating an image library from warped images of the model image and the model image, wherein each warped image is a transformation of the model image at a different pre-determined camera pose, capturing an image of the scene as a user moves the camera, reporting the current camera pose as a camera pose of the image when the image is acceptable, conditionally adding the first image to the image library when the first image is acceptable, and re-initializing the current camera pose to a camera pose selected from the image library when the first image is not acceptable.

18 Claims, 3 Drawing Sheets

CAMERA POSE ESTIMATION

CROSS-REFERENCE TO RELATED APPLICATIONS

This application claims benefit of U.S. Provisional Patent Application Ser. No. 61/711,992, filed Oct. 10, 2012, which is incorporated by reference herein in its entirety.

BACKGROUND OF THE INVENTION

1. Field of the Invention

Embodiments of the present invention generally relate to estimating the current pose of a camera as the camera is moved through space.

2. Description of the Related Art

Many interactive, camera-based applications rely on the estimation of camera pose with respect to a reference coordinate system. A classic example of such an application is augmented reality (AR), in which the estimated camera pose determines the perspective rendering of a virtual object. In general, AR is a live, direct or indirect, view of a physical, real-world environment which is augmented (or supplemented) by computer-generated sensory input such as sound, video, graphics or GPS data in order to enhance the user's perception of reality. The augmentation is conventionally performed in real-time and in semantic context with environmental elements, e.g., sports scores on TV during a sporting event.

In many AR scenarios, there is constant relative motion between the camera and the scene. In order to insert a virtual object such that the object appears geometrically consistent with the scene, the application determines the relative rotation and translation of the camera with respect to the scene, i.e., the camera pose.

Typically, once a starting pose estimate for a camera is computed, instantaneous image measurements are fused with past temporal information to continually update the camera pose. However, factors such as occlusion, motion blur, etc., can lead to noisy image measurements or discontinuities in temporal information that can render this pose update process unreliable or unstable. Under such circumstances, the camera pose estimate may need to be recovered.

There are two common approaches used for initializing and recovering a camera pose estimate. In one approach, the camera pose estimation algorithm has a-priori knowledge of the background scene. In this approach, warped versions of the background scene are generated in an offline phase. Thus, to initialize or recover the camera pose estimate, the algorithm can compare input images against the pre-generated warped images to estimate the pose.

In another approach, pose-invariant feature descriptors are used. In this approach, the features, F, computed from an image are invariant to changes in camera pose. Thus, even as the camera pose changes from the first image $I_0$, to image $I_t$ at time t, the algorithm can establish sufficient matches between $F_0$ and $F_t$ to recover the camera pose at time t. While use of pose-invariant features is powerful, their use is very computationally intensive, and hence, currently not widely deployed for embedded real-time use.

SUMMARY

Embodiments of the present invention relate to methods, apparatus, and computer readable media for camera pose estimation. In one aspect, a method of camera pose estimation in a camera is provided that includes capturing a model image of a scene at a pre-determined canonical camera pose, initializing a current camera pose to the pre-determined canonical camera pose, generating an image library from a plurality of warped images of the model image and the model image, wherein each warped image is a transformation of the model image at a different pre-determined camera pose, and wherein the image library includes the predetermined camera pose for each warped image and for the model image, capturing a first image of the scene as a user moves the camera, reporting the current camera pose as a camera pose of the first image when the first image is acceptable, adding the first image to the image library when the first image is acceptable, a sufficient amount of time has passed since another captured image was added to the image library, and the camera pose of the first image is sufficiently different from all camera poses in the image library, wherein adding the first image includes adding the camera pose of the first image to the image library, and re-initializing the current camera pose to a camera pose selected from the image library when the first image is not acceptable.

In one aspect, an apparatus configured to perform camera pose estimation is provided that includes means for capturing a model image of a scene at a pre-determined canonical camera pose, means for initializing a current camera pose to the pre-determined canonical camera pose, generating an image library from a plurality of warped images of the model image and the model image, wherein each warped image is a transformation of the model image at a different pre-determined camera pose, and wherein the image library includes the predetermined camera pose for each warped image and for the model image, means for capturing a first image of the scene as a user moves the apparatus, means for reporting the current camera pose as a camera pose of the first image when the first image is acceptable, means for adding the first image to the image library when the first image is acceptable, a sufficient amount of time has passed since another captured image was added to the image library, and the camera pose of the first image is sufficiently different from all camera poses in the image library, wherein adding the first image includes adding the camera pose of the first image to the image library, and means for re-initializing the current camera pose to a camera pose selected from the image library when the first image is not acceptable.

In one aspect, a non-transitory computer readable medium storing software instructions is provided. The software instructions, when executed by at least one processor in a camera, cause a method of camera pose estimation to be performed. The method includes capturing a model image of a scene at a pre-determined canonical camera pose, initializing a current camera pose to the pre-determined canonical camera pose, generating an image library from a plurality of warped images of the model image and the model image, wherein each warped image is a transformation of the model image at a different pre-determined camera pose, and wherein the image library includes the predetermined camera pose for each warped image and for the model image, capturing a first image of the scene as a user moves the camera, reporting the current camera pose as a camera pose of the first image when the first image is acceptable, adding the first image to the image library when the first image is acceptable, a sufficient amount of time has passed since another captured image was added to the image library, and the camera pose of the first image is sufficiently different from all camera poses in the image library, wherein adding the first image includes adding the camera pose of the first image to the image library, and re-initializing the current camera pose to a camera pose selected from the image library when the first image is not acceptable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
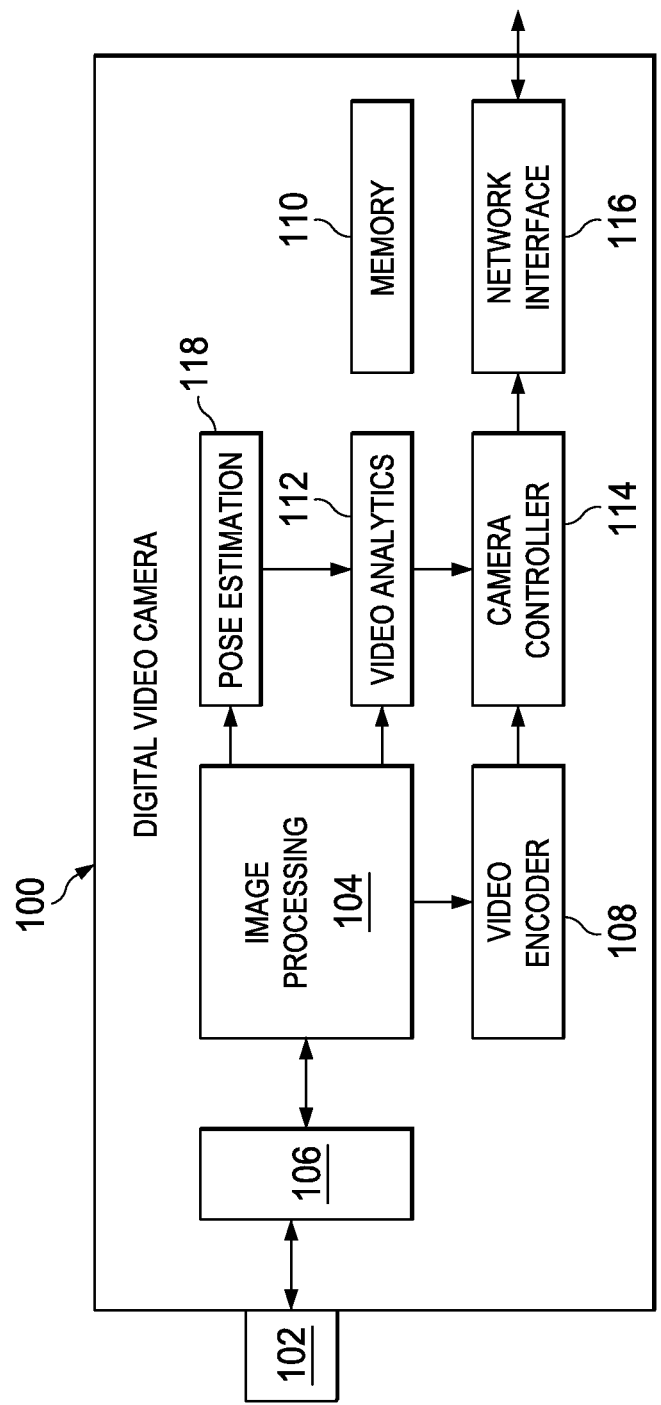
FIG. 1 is a block diagram of an example digital video camera.

Specific embodiments of the invention will now be described in detail with reference to the accompanying figures. Like elements in the various figures are denoted by like reference numerals for consistency.

Embodiments of the invention provide for camera pose initialization and re-initialization during use that does not require a-priori knowledge of the scene or the use of pose-invariant feature descriptors. In embodiments of the invention, the initial (starting) pose of the camera is assumed to be known, i.e., when the application incorporating the camera is initialized, a known canonical pose can be determined. From an image captured at this initial pose, warped versions are generated using known transformations. Features of each of the warped images and the model image are computed. The features of each image and the associated pose are saved in memory to form a library (set) of known images. As a user moves the camera, the image library is conditionally updated with features and poses of new images. Further, if the current camera pose cannot be determined, the camera pose is re-initialized by matching features of images captured as the user moves the camera to the current image library.

FIG. 1 is a block diagram of an example digital video camera 100 configured to perform pose estimation as described herein. The digital video camera 100 may be a standalone camera, or may be embedded in a device such as a mobile phone, a tablet computer, a wearable device such as eyeglasses, a handheld gaming device, etc. The camera 100 includes an imaging component 102, a controller component 106, an image processing component 104, a video encoder component 118, a memory component 110, a video analytics component 112, a camera controller 114, and a network interface 116. The components of the camera 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions such as software instructions embodying at least part of the pose estimation may be stored in memory in the memory component 110 and executed by one or more processors.

The imaging component 102 and the controller component 106 include functionality for capturing images of a scene. The imaging component 102 includes a lens assembly, a lens actuator, an aperture, and an imaging sensor. The imaging component 102 also includes circuitry for controlling various aspects of the operation of the component, such as, for example, aperture opening amount, exposure time, etc. The controller module 106 includes functionality to convey control information from the camera controller 114 to the imaging component 102, and to provide digital image signals to the image processing component 104.

The image processing component 104 divides the incoming digital signals into frames of pixels and processes each frame to enhance the image data in the frame. The processing performed may include one or more image enhancement techniques, such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment. Digital image from the image processing component 104 are provided to the video encoder component 108, the pose estimation component 118, and the video analytics component 112.

The video encoder component 108 encodes the images in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 110 may be on-chip memory, external memory, or a combination thereof. Any suitable memory design may be used. For example, the memory component 110 may include static random access memory (SRAM), dynamic random access memory (DRAM), synchronous DRAM (SDRAM), read-only memory (ROM), flash memory, a combination thereof, or the like. Various components in the digital video camera 100 may store information in memory in the memory component 110 as a video stream is processed. For example, the video encoder component 108 may store reference data in a memory of the memory component 110 for use in encoding frames in the video stream. Further, the memory component 110 may store any software instructions that are executed by one or more processors (not shown) to perform some or all of the described functionality of the various components.

Some or all of the software instructions may be initially stored in a computer-readable medium such as a compact disc (CD), a diskette, a tape, a file, memory, or any other computer readable storage device and loaded and stored on the digital video camera 300. In some cases, the software instructions may also be sold in a computer program product, which includes the computer-readable medium and packaging materials for the computer-readable medium. In some cases, the software instructions may be distributed to the digital video camera 100 via removable computer readable media (e.g., floppy disk, optical disk, flash memory, USB key), via a transmission path from computer readable media on another computer system (e.g., a server), etc.

The camera controller component 114 controls the overall functioning of the digital video camera 100. For example, the camera controller component 114 may adjust the focus and/or exposure of the imaging component 102 based on the focus quality and scene brightness, respectively, determined by the image processing component 104. The camera controller component 114 also controls the transmission of the encoded video stream via the network interface component 116 and may control reception and response to camera control information received via the network interface component 116. Further, the camera controller component 114 controls the transfer information from the video analytics component 112 via the network interface component 116.

The network interface component 116 allows the digital video camera 100 to communicate with a monitoring system. The network interface component 116 may provide an interface for a wired connection, e.g., an Ethernet cable or the like, and/or for a wireless connection. The network interface component 116 may use any suitable network protocol(s).

The video analytics component 312 analyzes the content of images in the captured video stream to detect and determine temporal events not based on a single image. The analysis capabilities of the video analytics component 312 may vary in embodiments depending on such factors as the processing capability of the digital video camera 300, the particular application for which the digital video camera is being used, etc. For example, the analysis capabilities may range from video motion detection in which motion is detected with respect to a fixed background model to face recognition, object recognition, gesture recognition, feature detection and tracking, etc. As part of the analysis of the content of images, the video analytics component 312 may use the estimated pose from the pose estimation component 118. Knowledge of the pose of the camera can help in improving the accuracy of video analysis tasks such as face or object recognition. For example, knowing the orientation of the camera can inform a face recognition algorithm of the likelihood of finding faces at a particular orientation in the image.

The pose estimation component 118 includes functionality to determine an initial pose of the camera 100 when an application needing pose estimation is started, to track the current pose of the camera 100, and to recover (re-initialize) the pose of the camera 100 in the event that incoming images are not sufficient (e.g., due to noise or temporal inconsistencies such as motion blur or dropped frames) to continue the pose tracking. The pose estimation component 118 is configured to perform a method for pose estimation as described herein in reference to FIG. 2.

Figure 2:
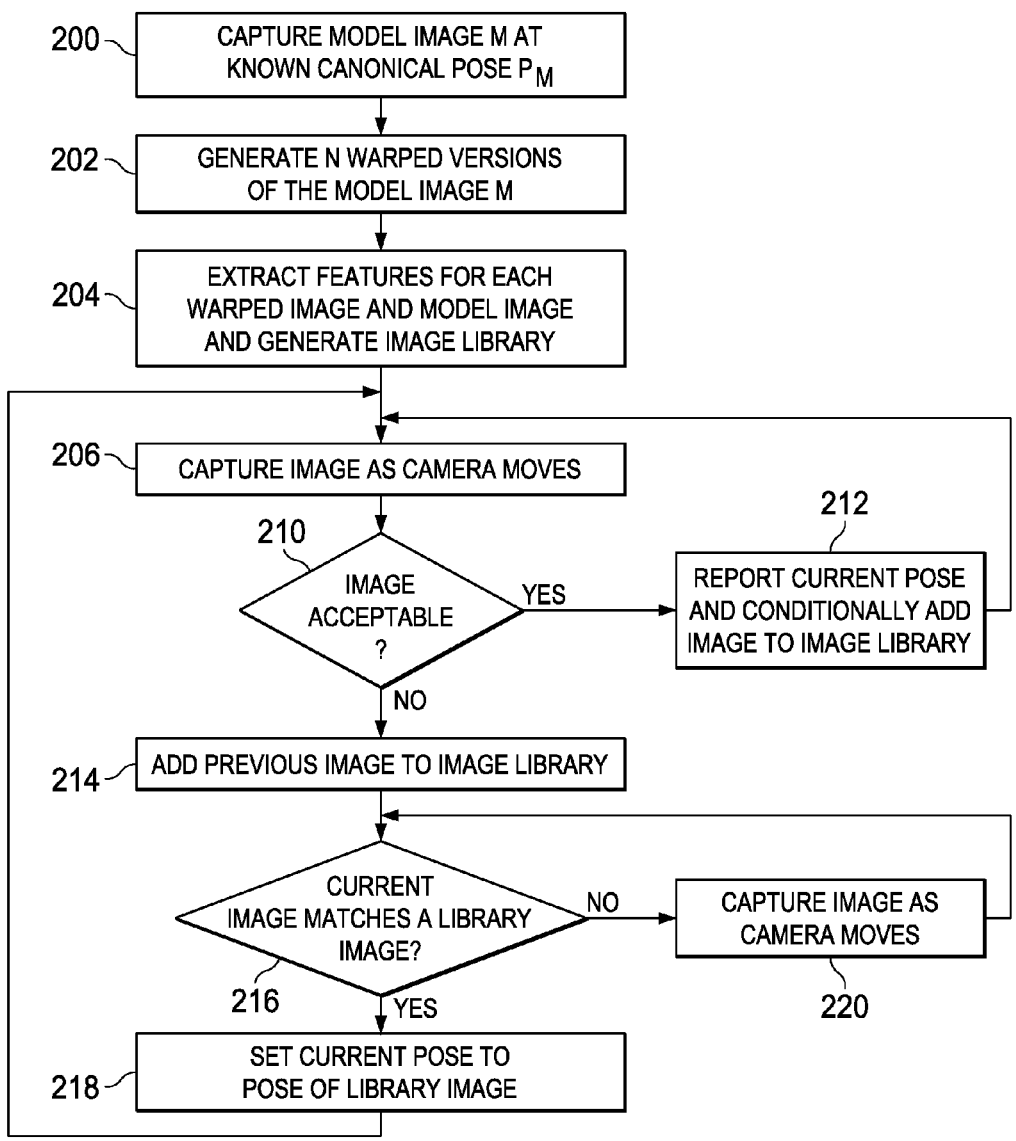
FIG. 2 is a flow diagram of method.

FIG. 2 is a flow diagram of a method for camera pose estimation that may be performed, for example, in a digital camera such as that of FIG. 1. This method may be viewed in three parts: pose estimation initialization, pose estimation normal operation, i.e., pose tracking, and pose estimation recovery. For initialization, e.g., at application start-up, a "model" image M is captured 200 when the camera is placed in a pre-defined canonical pose. That is, the image M is captured when the camera is positioned in a known orientation (pose). A typical example of such a known pose is a fronto-parallel orientation, where the camera plane is parallel to the scene plane. In some embodiments, input sources such as inertial sensors (gyroscopes, accelerometers, etc.) may be used to automatically identify when the camera is in a known, canonical pose. The initial camera pose for this model image is denoted as $P_M$.

Given the model image M, n transformed (warped) versions of the image are generated 202 by applying known transformations. That is, each of n warped images $W_i$, $1 \leq i \leq n$, are generated by applying a transformation $T_i$, to the model image M to generate an image $W_i$ that replicates how the planar scene in the image M would appear if the camera is at a different pose:

$$W_i = T_i(M)$$

Any suitable transformations may be used. The transformations $T_i$ correspond to common (expected) poses relative to the model M. For example, if the scene is assumed to be planar, a common transformation that may be used is a homography which is a 3×3 matrix of nine parameters. The set of nine parameters of a homography matrix describes the perspective transformation of a planar scene. Each homography matrix corresponds to a particular rotation and translation (or pose) of a calibrated camera with respect to the planar scene. Application of this matrix to the model image M results in an image $W_i$ corresponding to how the camera would see the scene when placed in a particular position corresponding to the parameters.

The effect of applying the transformation to the model image is to create n warped images, $W_i$, that capture the appearance of the planar scene of the model image from n different camera poses. That is, the transformations $T_i$ simulate n known camera poses. Any suitable value of n, e.g., 80, may be used. Some factors that may be considered in the choice of the value of n include: 1) the larger the value of n, the larger the amount of time needed to generate the warped images and the larger the amount of memory needed to store the warped images and the associated pose data; 2) the larger the library, the longer the amount of time needed to search the library for matches (the importance of which will be apparent in later detailed description); and 3) n is sufficiently large such that the library is adequate for pose estimation (i.e., too few warped images will provide unsatisfactory results).

Features are also extracted 204 and stored for each of the warped images $W_i$ and the model image M. The features of the ith image are denoted by A feature typically corresponds to a point in the image and is represented by a descriptor that captures the appearance of the local neighborhood around that point. Any suitable technique may be used to compute the features for an image. An example of a suitable technique may be found in G. Klein and D. Murray, "Parallel Tracking and Mapping on a Camera Phone," Proc. Eighth International Symposium on Mixed and Augmented Reality, pp. 83-86, October, 2009, Orlando, Fla.

Note that the net effect of the pose estimation initialization, i.e., capturing the model image, generating the warped images, and extracting the features of each image, is the generation of a library, or set, of known images $S=\{(F_0, P_0), (F_1, P_1), (F_2, P_2), (F_3, P_3) \ldots (F_n, P_n)\}$. For simplicity, the model image is considered to be part of the set of images, i.e., let $M=W_0=T_0(M)$, where $T_0$ is the identity matrix. The library of images may be stored in the memory 110 of the camera 100 of FIG. 1.

Once the pose estimation is initialized, the pose tracking begins, i.e., the camera pose is continually updated and reported for images in the input video stream. Images are captured 208 as the camera (or a device incorporating the camera) is moved. If an image captured at time t is acceptable 210, e.g., the image is not too noisy and/or is temporally consistent, the current pose is reported 212 to interested components, e.g., the video analytics component 112. The image may also be added 212 to the image library under certain conditions. In some embodiments, the number of images that may be added to the image library is limited to some number, e.g., 20, and new images are added in a first-in-first out (FIFO) fashion.

At time t, an image (i.e., the associated pose and computed features) is added to the image library if the following two conditions are satisfied. First, the condition $t-s > D_1$ must be satisfied where s is the time when the last image was added to the image library and $D_1$ is an elapsed time threshold. In other words, the current image is added if a sufficient amount of time $D_1$ has passed since the last entry into the set. The value of $D_1$ may be any suitable value. The choice of a value for $D_1$ may depend on factors such as how fast the camera is expected to move for a particular application and how much memory and compute power the device has to process new entries in the library.

Second, the condition difference $(P_t, P_i) > D_2$, for all $P_i$ elements of the library S must be satisfied where $D_2$ is a difference threshold. That is, the pose $P_t$ of the current image must be sufficiently different from all the poses contained in the image library S. Any suitable technique may be used to determine the pose $P_t$. In some embodiments, a camera pose P may be represented as the [x, y, z] coordinates of the camera position and another triplet that represents the camera orientation. Thus, computation of the difference between the current pose $P_t$ and the poses in the image library may be very efficient—how far apart are the two poses and the angle between the two poses.

The value of $D_2$ may be any suitable value. The choice of a value for $D_2$ may depend on factors such as how fast the camera is expected to move for a particular application and how much memory and compute power the device has to process new entries in the library. Note that if the values of $D_1$ and/or $D_2$ are low, many images may be added to the library, causing high load on system resources. Conversely, if the values of $D_1$ and/or $D_2$ are high, the library may not contain enough landmark images at different poses to effectively help in pose re-initialization.

Figure 3:
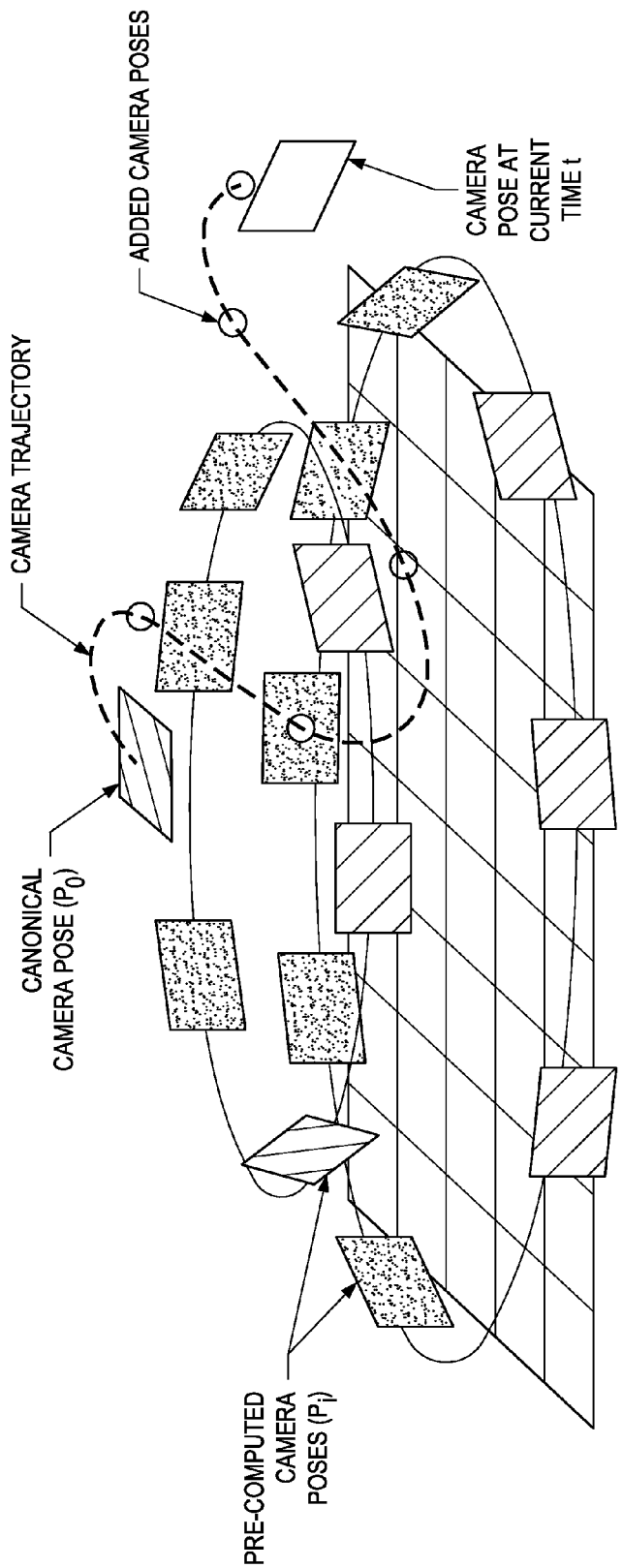
FIG. 3 is an example.

FIG. 3 is an example of a set of initial poses $P_i$, $0 <= i <= n$, and camera poses added to the image library S as the camera is moved through the scene. This example shows the various initial poses in two rings or a hemisphere looking down at the scene. The different shading indicate different poses in the three dimensional scene. The small circles indicate images/poses added to the image library as the camera is moved along the indicated trajectory.

Referring again to FIG. 2, if an image captured at time t, $I_t$, is not acceptable 210, then the user experience has been interrupted and camera pose update cannot continue as the images being received are not suitable for continuing pose estimation without re-initialization. At this point, a pose estimation re-initialization phase is entered with the assumption that the camera is moved in space within the scene with the intent of resuming the user experience. The image captured at time t−1, i.e., the features of image $I_{t-1}$ and the corresponding pose $P_{t-1}$, are added 214 to the image library. Since the pose update is interrupted at time t, the image at time t−1 is assumed to be captured at a valid pose.

After the image $I_{t-1}$ is added to the image library, an attempt is made to find a match 216 between the current image $I_t$ and an image in the image library (as augmented by images added as the camera was moved). If a match is found, then the current pose is set 218 to the pose of the matching image and normal pose estimation processing continues 208 with the next image. If no match is found 216, then the next image is captured 220 and an attempt is made to match 216 this image with one of the images in the set of warped images. The capture and match process is repeated until a match is found and the pose is re-initialized.

Since the size of the image library (set) S can be large, the process of searching for the best match may be split across several time instances to enable real time processing. Any suitable approach may be used for searching the image library. One approach that may be used is as follows. First, the current image is compared to the most recent addition to the library S, i.e., $I_{t-1}$. If there is no match, then the current image is compared to the model image M. If there is no match, then the current image is compared against m other images in the image library.

All the comparisons are done in feature space. That is, the features $F_t$ of the image $I_t$ are first compared to the features $F_{t-1}$ of the most recent image $I_{t-1}$ added to the library S. If the match score exceeds a pre-defined threshold, then the current image $I_t$ matches with that image. Any suitable technique may be used to determine the match score. For example, the match score may be some form of distance measure between the features. In some embodiments, symmetric transfer error is used to quantify the match between feature sets. The value of the matching threshold may be determined empirically based on the amount of noise expected in the image capture process and the amount and speed of motion expected.

If the match score is below the threshold, the features $F_t$ are compared to the features $F_0$ of the model image M. If the match score is again below the threshold, then the features are compared to the features of a maximum of m images from the set. As soon as a satisfactory match is found, the pose is updated to the pose of the matching image. If none of the m images are a satisfactory match, the current camera pose is declared to be invalid, and the next input image, $I_{t+1}$ is processed. Again, $F_{t+1}$ is first compared to $F_{t-1}$. If there is no match, then $F_{t+1}$ is compared to $F_0$. If there is no match, a new set of m library images are chosen for evaluation. The m images at time t+1 are distinct from those compared at time t. If no match is found, the same process repeats at time t+2, etc.

In this way, if there are n images in the library, n/m time instances are needed to search the entire library for a valid match. For example, assume that the library size is n=100, where there are 80 images corresponding the set of warped images generated at initialization, and 20 images corresponding to a circular buffer of images added to the image library during normal pose estimation. In order to meet real-time constraints, m may be limited to 2. Therefore, during pose re-initialization, every input image is compared against the image $I_{t-1}$, the model image M, and at most 2 other library images until a match is found. The library images are exhausted after 50 input images. Then, as new input images are captured, the library is searched again. Assuming a modest processing rate of 15 fps, it takes about 3 seconds to search through a library of 100 images.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein. For example, embodiments are described herein in which features and poses are stored in an image library. One of ordinary skill in the art will understand embodiments in which rather than storing features in the library, the images and feature coordinates are stored.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of camera pose estimation in a camera, the method comprising:
   capturing a model image of a scene at a pre-determined canonical camera pose;
   initializing a current camera pose to the pre-determined canonical camera pose;
   generating an image library from a plurality of warped images of the model image and the model image, wherein each warped image is a transformation of the model image at a different pre-determined camera pose, and wherein the image library comprises the predetermined camera pose for each warped image and for the model image;
   capturing a first image of the scene as a user moves the camera;
   reporting the current camera pose as a camera pose of the first image when the first image is acceptable;
   adding the first image to the image library when the first image is acceptable, a sufficient amount of time has passed since another captured image was added to the image library, and the camera pose of the first image is sufficiently different from all camera poses in the image library, wherein adding the first image comprises adding the camera pose of the first image to the image library; and
   re-initializing the current camera pose to a camera pose selected from the image library when the first image is not acceptable.

2. The method of claim 1, wherein
   generating an image library comprises computing features of each warped image and the model image, wherein the image library further comprises the features of each warped image and the model image; and
   adding the first image to the image library comprises computing features of the first image, wherein adding the first image comprises adding the features of the first image to the image library.

3. The method of claim 1, wherein re-initializing the current camera pose comprises:
   adding a second image to the image library, wherein the second image was captured prior to the first image, and adding the second image comprises adding a camera pose of the second image to the image library;
   comparing features of the first image to features of at least one image in the image library; and
   setting the current camera pose to the camera pose of a library image if the features of the first image match the features of the library image.

4. The method of claim 3, wherein re-initializing the current camera pose further comprises:
   comparing features of a third image to features of at least one image in the image library if the features of the first image do not match the features of any library image to which the first image was compared, wherein the third image is captured after the first image; and
   setting the current camera pose to the camera pose of a library image if the features of the third image match the features of the library image.

5. The method of claim 4, wherein comparing features of the first image comprises:
   comparing the features of the first image to features of the second image;
   comparing the features of the first image to features of the model image when the features of the first image do not match the features of the second image; and
   comparing the features of the first image to features of a selected first subset of other images in the image library when the features of the first image do not match the features of the model image.

6. The method of claim 5, wherein comparing features of the third image comprises:
   comparing the features of the third image to features of the second image;
   comparing the features of the third image to features of the model image when the features of the third image do not match the features of the second image; and
   comparing the features of the third image to features of a selected second subset of other images in the image library when the features of the third image do not match the features of the model image, wherein the second subset is different from the first subset.

7. An apparatus configured to perform camera pose estimation, the apparatus comprising:
   means for capturing a model image of a scene at a pre-determined canonical camera pose;
   means for initializing a current camera pose to the pre-determined canonical camera pose;
   means for generating an image library from a plurality of warped images of the model image and the model image, wherein each warped image is a transformation of the model image at a different pre-determined camera pose, and wherein the image library comprises the predetermined camera pose for each warped image and for the model image;
   means for capturing a first image of the scene as a user moves the apparatus;
   means for reporting the current camera pose as a camera pose of the first image when the first image is acceptable;
   means for adding the first image to the image library when the first image is acceptable, a sufficient amount of time has passed since another captured image was added to the image library, and the camera pose of the first image is sufficiently different from all camera poses in the image library, wherein adding the first image comprises adding the camera pose of the first image to the image library; and
   means for re-initializing the current camera pose to a camera pose selected from the image library when the first image is not acceptable.

8. The apparatus of claim 7, wherein
   means for generating an image library computes features of each warped image and the model image, wherein the image library further comprises the features of each warped image and the model image; and
   the means for adding the first image to the image library computes features of the first image, wherein adding the first image comprises adding the features of the first image to the image library.

9. The apparatus of claim 7, wherein the means for re-initializing the current camera pose comprises:
   means for adding a second image to the image library, wherein the second image was captured prior to the first image, and adding the second image comprises adding a camera pose of the second image to the image library;

means for comparing features of the first image to features of at least one image in the image library; and means for setting the current camera pose to the camera pose of a library image if the features of the first image match the features of the library image.

10. The apparatus of claim 9, wherein the means for re-initializing the current camera pose further comprises:

means for comparing features of a third image to features of at least one image in the image library if the features of the first image do not match the features of any library image to which the first image was compared, wherein the third image is captured after the first image; and means for setting the current camera pose to the camera pose of a library image if the features of the third image match the features of the library image.

11. The apparatus of claim 10, wherein the means for comparing features of the first image comprises:

means for comparing the features of the first image to features of the second image;

means for comparing the features of the first image to features of the model image when the features of the first image do not match the features of the second image; and means for comparing the features of the first image to features of a selected first subset of other images in the image library when the features of the first image do not match the features of the model image.

12. The apparatus of claim 11, wherein the means for comparing features of the third image comprises:

means for comparing the features of the third image to features of the second image;

means for comparing the features of the third image to features of the model image when the features of the third image do not match the features of the second image; and means for comparing the features of the third image to features of a selected second subset of other images in the image library when the features of the third image do not match the features of the model image, wherein the second subset is different from the first subset.

13. A non-transitory computer readable medium storing software instructions that, when executed by at least one processor in a camera, cause a method of camera pose estimation to be performed, the method comprising:

capturing a model image of a scene at a pre-determined canonical camera pose;

initializing a current camera pose to the pre-determined canonical camera pose;

generating an image library from a plurality of warped images of the model image and the model image, wherein each warped image is a transformation of the model image at a different pre-determined camera pose, and wherein the image library comprises the predetermined camera pose for each warped image and for the model image;

capturing a first image of the scene as a user moves the camera;

reporting the current camera pose as a camera pose of the first image when the first image is acceptable;

adding the first image to the image library when the first image is acceptable, a sufficient amount of time has passed since another captured image was added to the image library, and the camera pose of the first image is sufficiently different from all camera poses in the image library, wherein adding the first image comprises adding the camera pose of the first image to the image library; and initializing the current camera pose to a camera pose selected from the image library when the first image is not acceptable.

14. The computer readable medium of claim 13, wherein generating an image library comprises computing features of each warped image and the model image, wherein the image library further comprises the features of each warped image and the model image; and adding the first image to the image library comprises computing features of the first image, wherein adding the first image comprises adding the features of the first image to the image library.

15. The computer readable medium of claim 13, wherein re-initializing the current camera pose comprises:

adding a second image to the image library, wherein the second image was captured prior to the first image, and adding the second image comprises adding a camera pose of the second image to the image library;

comparing features of the first image to features of at least one image in the image library; and setting the current camera pose to the camera pose of a library image if the features of the first image match the features of the library image.

16. The computer readable medium of claim 15, wherein re-initializing the current camera pose further comprises:

comparing features of a third image to features of at least one image in the image library if the features of the first image do not match the features of any library image to which the first image was compared, wherein the third image is captured after the first image; and setting the current camera pose to the camera pose of a library image if the features of the third image match the features of the library image.

17. The computer readable medium of claim 16, wherein comparing features of the first image comprises:

comparing the features of the first image to features of the second image;

comparing the features of the first image to features of the model image when the features of the first image do not match the features of the second image; and comparing the features of the first image to features of a selected first subset of other images in the image library when the features of the first image do not match the features of the model image.

18. The computer readable medium of claim 17, wherein comparing features of the third image comprises:

comparing the features of the third image to features of the second image;

comparing the features of the third image to features of the model image when the features of the third image do not match the features of the second image; and comparing the features of the third image to features of a selected second subset of other images in the image library when the features of the third image do not match the features of the model image, wherein the second subset is different from the first subset.

* * * * *